(12) United States Patent
Krupka et al.

(10) Patent No.: US 8,224,839 B2
(45) Date of Patent: Jul. 17, 2012

(54) SEARCH QUERY EXTENSION

(75) Inventors: Eyal Krupka, Herzeliya (IL); Ofer Dekel, Redmond, WA (US); Ron Karidi, Herzeliya (IL)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 12/419,325

(22) Filed: Apr. 7, 2009

(65) Prior Publication Data

US 2010/0257193 A1 Oct. 7, 2010

(51) Int. Cl.
*G06F 7/00* (2006.01)
*G06F 17/30* (2006.01)

(52) U.S. Cl. ............... 707/765; 707/805; 707/E17.016; 707/E17.03; 707/E17.074; 715/708; 715/764

(58) Field of Classification Search .......... 707/765, 707/759, 721, 722, 723, 805, E17.016, E17.03, 707/E17.074; 715/764, 708
See application file for complete search history.

(56) References Cited

U.S. PATENT DOCUMENTS

| | | | | |
|---|---|---|---|---|
| 5,625,554 A * | 4/1997 | Cutting et al. | ........ | 707/E17.074 |
| 6,169,986 B1 * | 1/2001 | Bowman et al. | ....... | 707/999.004 |
| 6,567,797 B1 | 5/2003 | Schuetze et al. | | |
| 6,574,632 B2 | 6/2003 | Fox et al. | | |
| 6,633,868 B1 | 10/2003 | Min et al. | | |
| 6,701,309 B1 * | 3/2004 | Beeferman et al. | .... | 707/999.004 |
| 6,772,150 B1 * | 8/2004 | Whitman et al. | ............. | 707/721 |
| 7,117,432 B1 * | 10/2006 | Shanahan et al. | ............. | 715/210 |
| 7,136,845 B2 * | 11/2006 | Chandrasekar et al. | ....................... | 707/999.003 |
| 7,194,454 B2 | 3/2007 | Hansen et al. | | |
| 7,284,191 B2 * | 10/2007 | Grefenstette et al. | .......... | 715/230 |
| 7,346,839 B2 | 3/2008 | Acharya et al. | | |
| 7,756,855 B2 * | 7/2010 | Ismalon | ........................ | 707/713 |
| 7,849,071 B2 * | 12/2010 | Riise et al. | .................... | 707/708 |
| 7,890,539 B2 * | 2/2011 | Boschee et al. | ............... | 707/794 |
| 8,001,139 B2 * | 8/2011 | Slaney et al. | .................. | 707/765 |
| 2005/0108213 A1 * | 5/2005 | Riise et al. | ......................... | 707/3 |
| 2005/0216443 A1 * | 9/2005 | Morton et al. | ...................... | 707/3 |
| 2006/0074881 A1 * | 4/2006 | Vembu et al. | ...................... | 707/3 |
| 2007/0078828 A1 | 4/2007 | Parikh et al. | | |
| 2007/0214131 A1 | 9/2007 | Cucerzan et al. | | |
| 2007/0219980 A1 | 9/2007 | Songfack | | |
| 2007/0250492 A1 * | 10/2007 | Angel et al. | ....................... | 707/4 |
| 2008/0010269 A1 * | 1/2008 | Parikh | .............................. | 707/5 |
| 2008/0183685 A1 | 7/2008 | He et al. | | |

(Continued)

OTHER PUBLICATIONS

Goran Nenadić, Hideki Mimab, Irena Spasic, Sophia Ananiadoua and Jun-ichi Tsujiic—"Terminology-driven literature mining and knowledge acquisition in biomedicine"—International Journal of Medical Informatics vol. 67, Issues 1-3, Dec. 4, 2002, pp. 33-48.*

(Continued)

*Primary Examiner* — John E Breene
*Assistant Examiner* — Anh Ly
(74) *Attorney, Agent, or Firm* — Toler Law Group, PC

(57) ABSTRACT

Methods, systems, and computer-readable media for search query extension are disclosed. A particular method retrieves a set of queries related to a search query from a query repository. The search query includes one or more search words and at least one search word is included in each query in the set of queries. A set of context words based on one or more computer-readable files accessible to a computer is generated and an intersection is calculated. The intersection is based on the set of queries and the set of context words. An extended search query is generated based on the calculated intersection and the search query.

17 Claims, 8 Drawing Sheets

U.S. PATENT DOCUMENTS

2009/0024613 A1* 1/2009 Niu et al. ............... 707/5
2009/0031232 A1* 1/2009 Brezina et al. ............... 707/3
2010/0010989 A1* 1/2010 Li et al. ............... 707/5

OTHER PUBLICATIONS

Peter Mika, Edgar Meij, and Hugo Zaragoza—"Investigating the Semantic Gap through Query Log Analysis"—The Semantic Web—ISWC 2009, Lecture Notes in Computer Science, 2009, vol. 5823/2009, pp. 441-455, 2009, Springer-Verlag Berlin Heidelberg 2009.*

Francisco, et al., "Clique Analysis of Query Log Graphs", String Processing and Information Retrieval, retrieved at <<http://research.yahoo.com/files/spire2008.pdf>>, Nov. 14, 2008, pp. 1-12.

White, et al., "Comparing Query Logs and Pseudo-Relevance Feedback for Web-Search Query Refinement", The 30th Annual International ACM SIGIR Conference, retrieved at <<http://research.microsoft.com/en-us/people/silviu/sigir07-3,pdf>>, Jul. 23-27, 2007, pp. 1-2.

Abhishek, Vibhanshu., "Keyword Generation for Search Engine Advertising using Semantic Similarity between Terms", Proceedings of the Sixteenth International World Wide Web Conference, retrieved at <<http://www2007.org/workshops/paper_87.pdf>>, May 8-12, 2007, pp. 1-6.

Baeza-Yates, Ricardo., "VIDEOLECTURES.NET", "Extracting Semantic Relations from Query Logs", The 13th International conference on Knowledge Discovery and Data Mining, retrieved at <<http://videolectures.net/kdd07_baeza_yates_esr/>>, Aug. 12-15, 2007, pp. 1-2.

Katz, et al., "Word Sense Diambiguation for Information Retrieval", Proceedings of the sixteenth national conference on Artificial intelligence and the eleventh Innovative applications of artificial intelligence conference innovative applications of artificial intelligence, retrieved at <<http://people.csail.mit.edu/ozlem/abstract00-uzuner-wsd.pdf>>, Jul. 18-22, 1999, pp. 1-3.

Cucerzan, Silviu., "Large-Scale Named Entity Disambiguation Based on Wikipedia Data", Proceedings of the 2007 Joint Conference on Empirical Methods in Natural Language Processing and Computational Natural Language Learning, retrieved at <<http://www.aclweb.org/anthology-new/D/D07/D07-1074.pdf>>, Jun. 28-30, 2007, pp. 708-716.

Teevan, et al., "Personalizing Search via Automated Analysis of Interests and Activities", The 28th Annual International ACM SIGIR Conference on Research and Development in Information Retrieval, retrieved at <<http://research.microsoft.com/en-us/um/people/horvitz/SIGIR2005_personalize.pdf>>, Aug. 15-19, 2005, pp. 1-8.

* cited by examiner

SEARCH QUERY EXTENSION

BACKGROUND

Search engines are frequently used by Internet users to locate information on the Internet that is of interest. Search engines generally operate by receiving a search query from a user and returning search results to the user. Many search engines order the returned search results in some fashion (e.g., based on the relevance of each returned search result to the search query). Thus, the quality of the search query may greatly impact the quality of the search results. However, a search query from a user may be incomplete or overbroad (e.g., the search query does not include enough words to generate a focused set of relevant results and instead generates a large number of irrelevant results).

One current method of improving search results is using word frequencies to weight search words by importance. However, this method may result in irrelevant words (e.g., "a," "and," "the," etc.) having high weights because they are among the most frequently used words. Another method of improving search results is by using an encyclopedia to disambiguate words in the search queries. For example, an online encyclopedia may be used in an attempt to determine whether as earh term, the word "bar" in a search query, refers to a retail establishment where alcohol is served, a counter from which drinks are dispensed, a unit of pressure measurement, a segment of music, a legal organization, a type of lagoon, etc. However, word disambiguation may not directly identify any way to improve the search query itself.

SUMMARY

The present disclosure relates to extending a search query based on contextual information related to the search query and based on frequently used related queries from a query repository. When a search query is detected, a set of related queries is retrieved from a query repository, and the current user context (e.g., computer-readable files such as a document being edited, an e-mail being viewed, a currently open webpage, etc.) is used to generate a set of context words. An intersection of the set of related queries and the set of context words is generated, and the search query may be extended with one or more words resulting from the intersection.

In a particular embodiment, the extended search query is used in ordering search results from a search engine that were generated based on the initial search query. In another particular embodiment, the extended search query is used to initiate a new revised search to retrieve more relevant results from a search engine.

In a particular embodiment, user privacy is preserved by verifying that private information is not revealed in the extended search query. If private information is detected, the private information may be removed from the extended search query before the extended search query is sent to the search engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
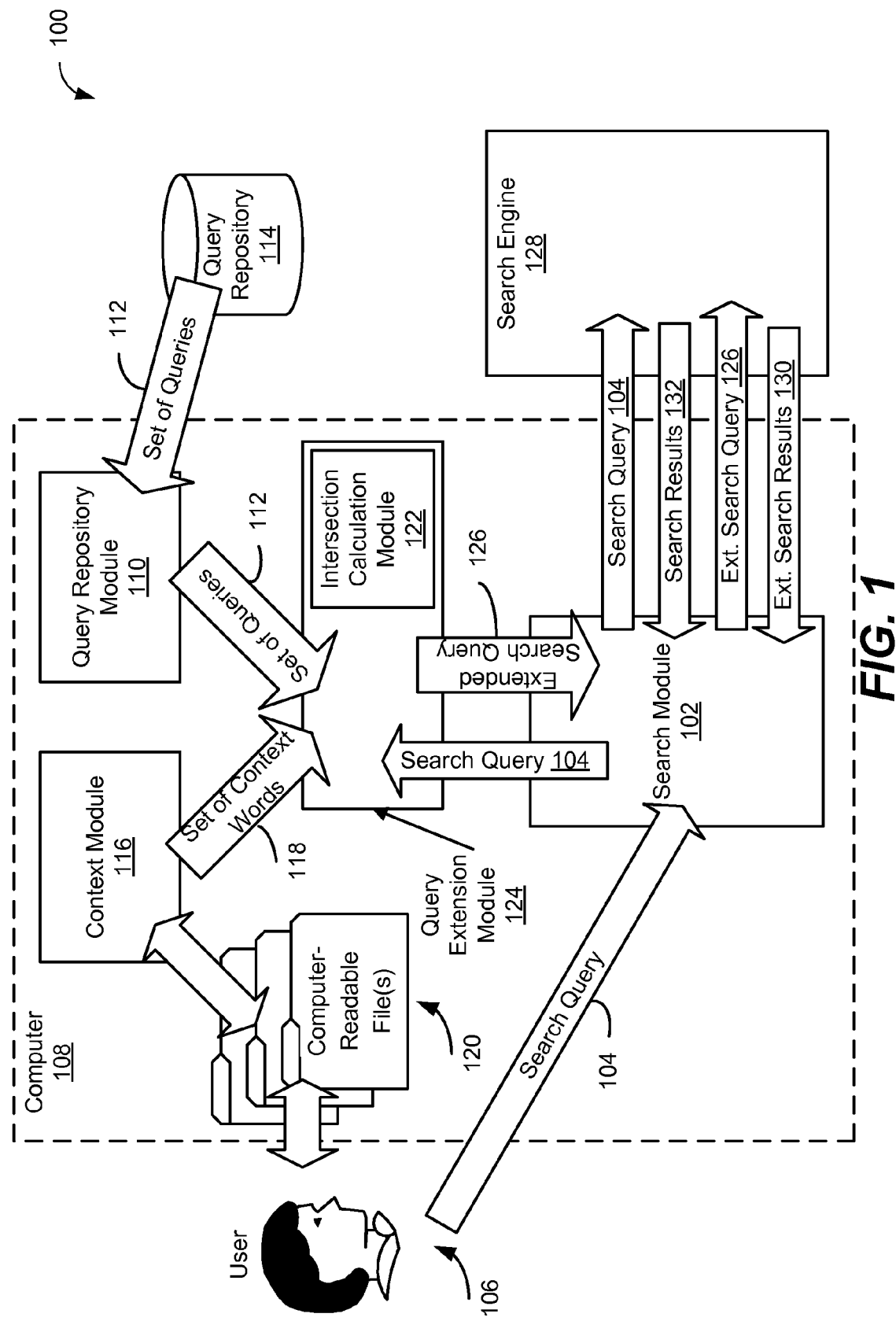
FIG. 1 is a block diagram of a particular embodiment of a search query extension system.

In a particular embodiment, a method is disclosed that includes retrieving a set of queries related to a search query from a query repository. The search query includes one or more search words and at least one search word of the one or more search words is included in each query in the set of queries. The method also includes generating a set of context words based on one or more computer-readable files accessible to a computer. The method further includes calculating an intersection based on the set of queries and the set of context words. The method includes creating an extended search query by extending the search query based on the calculated intersection.

In another particular embodiment, a system is disclosed that includes a search module. The search module includes computer-executable instructions to receive a search query from a user at a computer, where the search query includes one or more search words. The system also includes a query repository module that includes computer-executable instructions to retrieve a set of queries related to the search query from a query repository. At least one search word of the one or more search words is included in each query in the set of queries. The system also includes a context module that includes computer-executable instructions to generate a set of context words based on one or more computer-readable files accessible to the computer. The system includes an intersection calculation module that includes computer-executable instructions to calculate an intersection of the set of queries and the set of context words. The system also includes a query extension module that includes computer-executable instructions to create an extended search query by extending the search query based on the calculated intersection.

In another particular embodiment, a computer-readable medium is disclosed. The computer-readable medium includes instructions, that when executed by a computer, cause the computer to receive a search query from a user at the computer. The search query includes one or more search words. The computer-readable medium also includes instructions, that when executed by the computer, cause the computer to retrieve a set of queries related to the search query from a query repository. The query repository may be remote from the computer and at least one search word of the one or more search words is included in each query in the set of queries. The computer-readable medium also includes instructions, that when executed by the computer, cause the computer to generate a set of context words based on one or more computer-readable files accessible to the computer. The computer-readable medium also includes instructions, that when executed by the computer, cause the computer to calculate an intersection of the set of queries and the set of context words. The calculated intersection includes a plurality of intersection words. The computer-readable medium also includes instructions, that when executed by the computer, cause the computer to receive a user selection of at least one of the plurality of intersection words and create an extended search query by adding the at least one user selected intersection word to the search query. The computer-readable medium also includes instructions, that when executed by the computer, cause the computer to retrieve a plurality of search results from a search engine based on the search query. The computer-readable medium includes instructions, that when executed by the computer, cause the computer to order the plurality of search results based on a relevance of each particular search result of the plurality of search results to the extended search query.

FIG. 1 is a block diagram of a particular embodiment of a search query extension system 100. The system 100 includes a computer 108 communicatively coupled to a query repository 114 and a search engine 128. The computer 108 is configured to receive input from a user 106 and display output to the user 106. The computer 108 also includes one or more computer-readable files 120 that are accessible by the user 106.

The computer 108 includes a search module 102 configured to receive a search query 104 from the user 106. The search module 102 may also be configured to send the search query 104 to the search engine 128 and receive search results 132 from the search engine 128 in response to the search query 104. The search module 102 is further configured to send the search query 104 to a query extension module 124 at the computer 108 and to receive an extended search query 126 from the query extension module 124. In a particular embodiment, the search module 102 is also configured to send the extended search query 126 to the search engine 128 and receive extended search results 130 from the search engine 128 that are relevant to the extended search query 126.

The computer 108 also includes a query repository module 110 and a context module 116. The query repository module 110 is configured to retrieve a set of queries 112 from the query repository 114. In a particular embodiment, the query repository 114 includes a query log associated with the search engine 128 that is remote from the computer 108. In such an embodiment, the set of queries 112 from the query repository 114 may be ordered based on how many times each query in the set of queries 112 has been submitted to the search engine 128. For example, the set of queries 112 may be ordered based on how many times each query in the set of queries 112 has been submitted to the search engine 128 in a previous time period (e.g., previous day, week, or month). In another particular embodiment, the query repository 114 may include one or more files associated with the user 106. The query repository module 110 is further configured to send the set of queries 112 to the query extension module 124.

The context module 116 is configured to access the one or more computer readable files 120 to generate a set of context words 118 based on the one or more computer readable files 120. The context module 116 is also configured to send the generated set of context words 118 to the query extension module 124. The computer-readable files 120 may include a document, an electronic mail (e-mail) message, a webpage, or an instant message (IM) at the computer 108. The computer-readable files 120 may also include both opened as well as unopened files at the computer 108.

The query extension module 124 is configured to receive the search query 104 from the search module 102, and includes an intersection calculation module 122. The intersection calculation module 122 is configured to calculate an intersection of the set of queries 112 and the set of context words 118 received at the query extension module 124. The query extension module 124 is configured to create the extended search query 126 by extending the search query 104 based on the intersection calculated by the intersection calculation module 122. The query extension module 124 is also configured to send the created extended search query 126 to the search module 102.

In operation, the user 106 may enter the search query 104 at the computer 108. The search query 104 may be entered at an application at the computer 108, such as an e-mail application, an IM application, a web browser application, a word processing application, a spreadsheet application, a presentation application, or a multimedia application. For example, the user 106 may enter the search query 104 "Texas" in a search field of a web browser at the computer 108. In a particular embodiment, the search query 104 is used by the search module 102 to retrieve search results 132 that are relevant to the search query 104 from the search engine 128, and the search module 102 displays the search results 132 to the user 106. The search module 102 also sends the received search query 104 to the query extension module 124 so that the search query 104 may be extended.

The query extension module 124 also receives the set of context words 118 from the context module 116, the set of context words 118 based on the one or more computer-readable files 120. When the computer-readable files 120 include a document, an e-mail, or an instant message, the set of context words 118 may include words located in the header, footer, or body of the document, e-mail, or instant message. When the computer-readable files include a multimedia file (e.g., an MP3 file), the set of context words 118 may include words located in metadata for the multimedia file (e.g., an ID3 tag of the MP3 file). In a particular embodiment, the set of context words 118 is generated in response to the entry of the search query 104 by the user 106. In another particular embodiment, the set of context words 118 is regularly generated, updated, and stored based on changes in the contents of the computer-readable files 120.

The query extension module 124 also receives a set of queries 112 from the query repository module 110. Each query in the set of queries 112 has at least one word in common with the search query 104. For example, when the search query 104 is "Texas" and the query repository 114 is a query log associated with the search engine 128, the set of queries 112 may include previously submitted queries to the search engine 128 that include the word "Texas," such as "Map of Texas," "History of Texas," "Texas Longhorns," and "Texas Lottery."

Upon receiving the set of context words 118 and the set of queries 112, the intersection calculation module 122 at the query extension module 124 calculates an intersection of the set of context words 118 and the set of queries 112. In a particular embodiment, the calculated intersection includes words that are common to both the set of context words 118 and the set of queries 112. For example, if the set of context words 118 includes the words "State History," "Federal Government," and "Local Politics" and the set of queries 112 includes "Map of Texas," "History of Texas," "Texas Longhorns," and "Texas Lottery," then the calculated intersection may include the word "History."

Once the intersection has been calculated by the intersection calculation module 122, the query extension module 124 may extend the search query 104 based on the calculated intersection. For example, the query extension module 124 may create the extended search query 126 "Texas History" by appending the intersection word "History" to the search query 104 "Texas." In addition to appending intersection words to the search query 104, the query extension module 124 may also be capable of replacing words in the search query 104 with one or more of the intersection words. In a particular embodiment, the query extension module 124 may send the extended search query 126 to the search module 102.

It should be noted that in a particular embodiment, one or more of the modules 102, 110, 116, 122, and 124 may be included in an application at the computer 108. It should further be noted that although the particular embodiment illustrated in FIG. 1 depicts the modules 102, 110, 116, 122, and 124 within a single computer 108, one or more of the modules may also distributed across multiple computers or located remotely from the computer 108 and may be available to the computer 108 via a service (e.g., a web service or dynamically linked library) accessible to the computer 108.

It will be appreciated that the system 100 of FIG. 1 may improve search results by extending search queries received from users. For example, the extended search query 126 "Texas History" may provide more relevant results (e.g., the extended search results 130) to the user 106 than the results (e.g., the search results 132) based on the original search query 104 "Texas." As another example, the extended search query 126 "Texas History" may be used to sort the search results 132, such that results that include historical information about the State of Texas appear at the top of the search results 132 when the search results 132 are displayed to the user 106.

Figure 2:
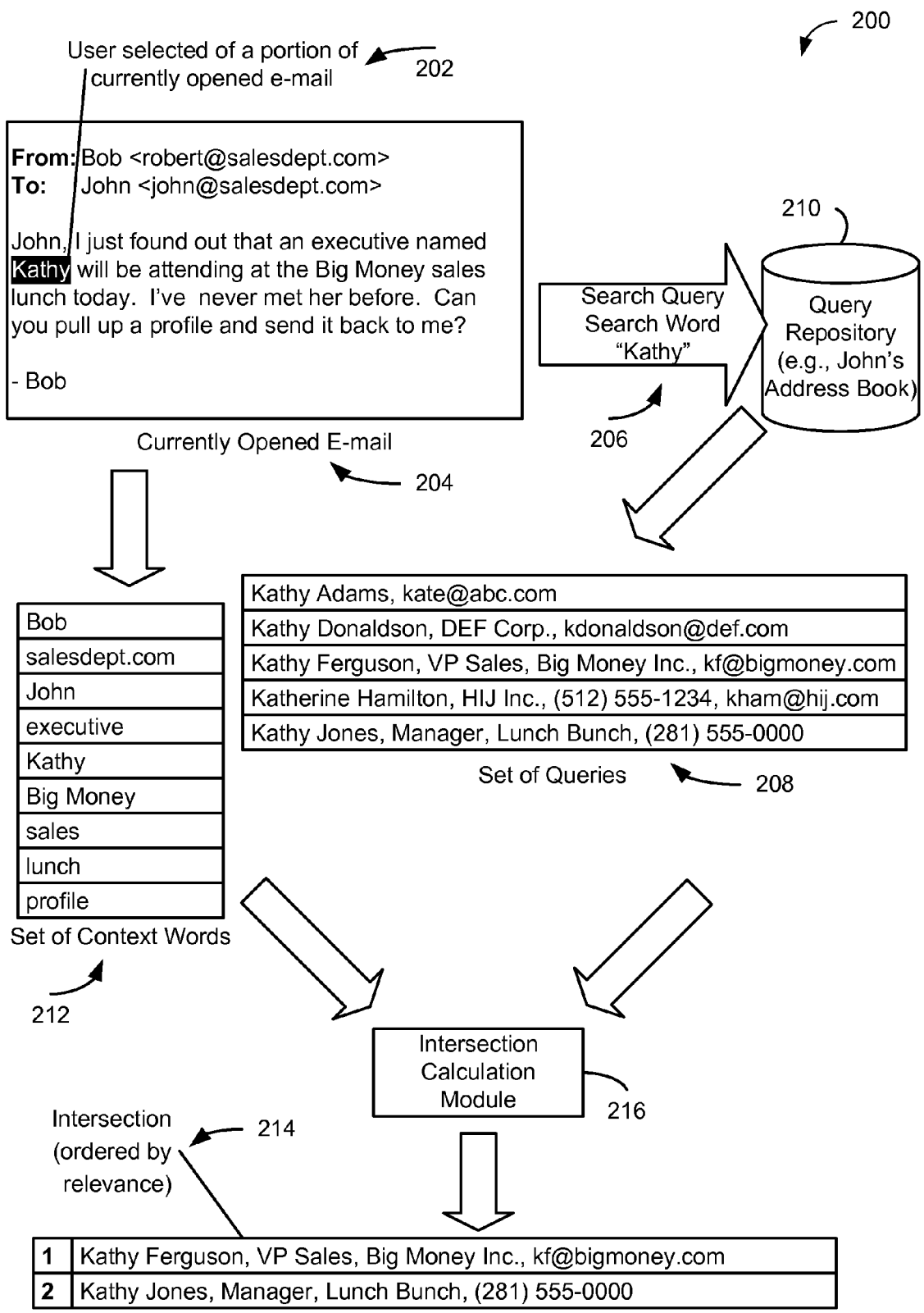
FIG. 2 is a diagram of a particular embodiment of a search query extension method.

FIG. 2 is a diagram to illustrate a particular embodiment of a search query extension method 200. In an illustrative embodiment, the method 200 may be performed by the system 100 of FIG. 1.

The method 200 of FIG. 2 is generally illustrated via a usage scenario of a query extension system (e.g., the system 100 of FIG. 1) by a user John after a user Bob asks John to retrieve a profile for a person named "Kathy." The method 200 begins when a user selection of a portion of a computer-readable file is detected. For example, the user selection 202 of the word "Kathy" in the currently opened e-mail 204 from Bob to John may be detected. A search query may be formed based on the selected portion of the computer-readable file. For example, a search query 206 that includes the search word "Kathy" may be formed. In an illustrative embodiment, the search query 206 may be formed by a search module, such as the search module 102 of FIG. 1.

The search query may be used to retrieve a set of queries from a query repository. For example, the search query 206 that includes the search word "Kathy" may be used to retrieve a set of queries 208 from a query repository 210 that includes John's address book. Each query in the set of queries 208 may include the search word "Kathy." In an illustrative embodiment, the set of queries 208 may be retrieved by a query repository module, such as the query repository module 110 of FIG. 1.

A set of context words may be formed based on a computer-readable file. For example, the set of context words 212 may be formed based on the currently opened e-mail 204, where the set of context words 212 includes words from the currently opened e-mail 204. In an illustrative embodiment, the set of context words 212 may be formed by a context module, such as the context module 116 of FIG. 1.

The set of queries 208 and the set of context words 212 may be sent to an intersection calculation module 216. The intersection calculation module 216 may calculate an intersection 214 of the set of queries 208 and the set of context words 212. In a particular embodiment, each item in the calculated intersection 214 includes at least one word that is common to both the set of context words 212 and the set of queries 208. The intersection 214 may also be ordered by relevance. For example, the intersection 214 includes two items, ordered by the number of common words or phrases in each item. The intersection item for Kathy Ferguson is ranked first because it has three common words/phrases ("Kathy," "sales," "Big Money") and the intersection item for Kathy Jones is ranked second because it has two common words/phrases ("Kathy" and "lunch"). In an illustrative embodiment, the intersection calculation module 216 may include the intersection calculation module 122 of FIG. 1.

Upon being calculated, the intersection 214 may be displayed to a user. For example, the intersection 214 may be displayed to the user John, and John may choose to extend his original search query 206 with one or more words from the intersection item for Kathy Ferguson, who may be the "Kathy" referred to in the currently opened e-mail 204. In another particular embodiment, the original search query 206 may be extended automatically without user intervention. In an illustrative embodiment, such an extended search query may be generated by a query extension module, such as the query extension module 124 of FIG. 1.

It will be appreciated that the method 200 of FIG. 2 may be used to extend and improve search queries. For example, in the particular embodiment illustrated in FIG. 2, if John entered the original search query 206 "Kathy" into a search engine (e.g., the search engine 128 of FIG. 1), John may have received search results including information about many different people named "Kathy," including information about people not referred to in the currently opened e-mail 204. In contrast, when the original search query 206 is extended with one or more words from the intersection 214 (e.g., "Ferguson," "VP," "sales," "Big Money," and "kf@bigmoney.com"), the resulting extended search query (e.g., "Kathy Ferguson VP sales Big Money kf@bigmoney.com") may produce more relevant search results for the person referred to in the currently opened e-mail 204.

Figure 3:
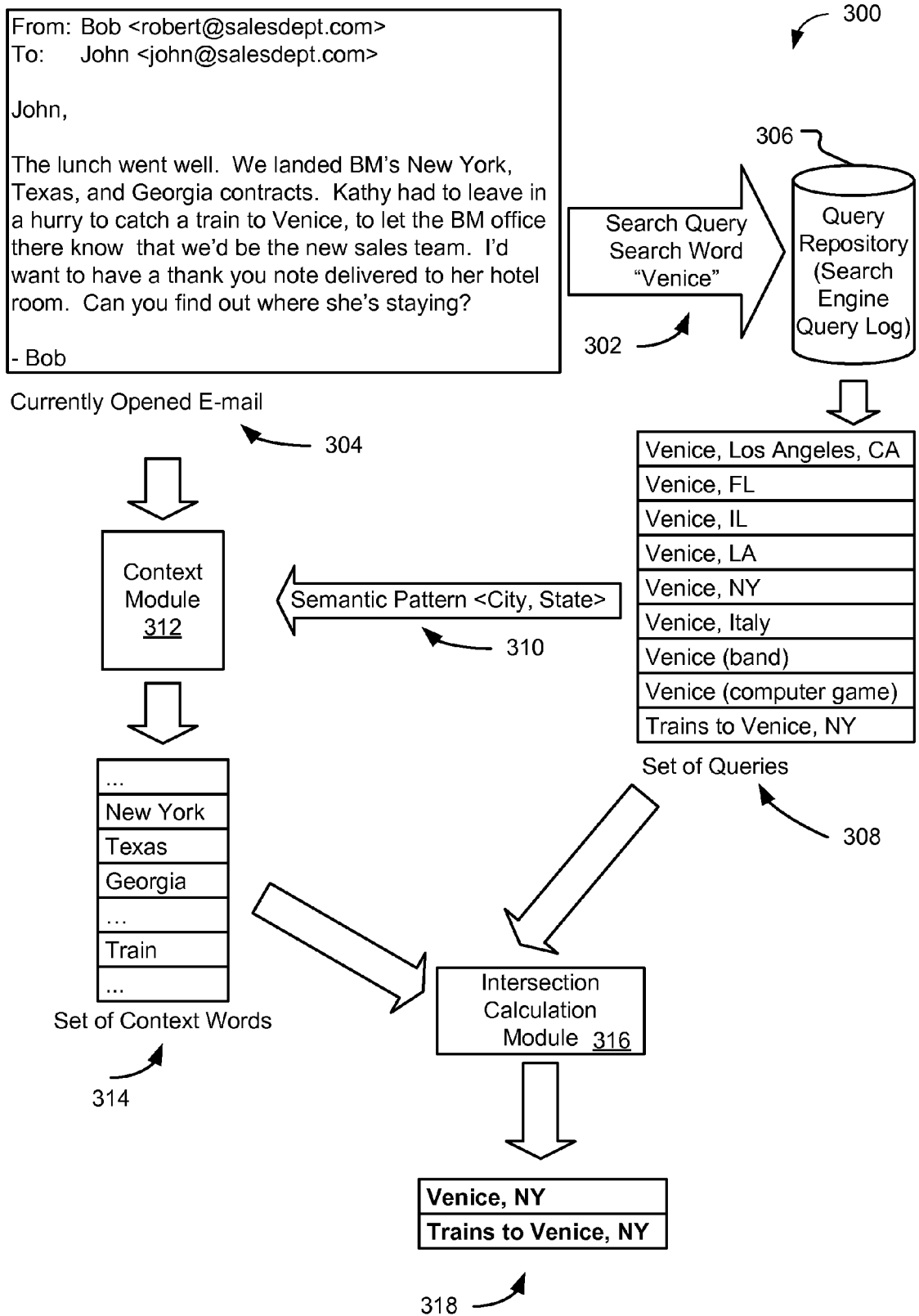
FIG. 3 is a diagram of another particular embodiment of a search query extension method.

FIG. 3 is a diagram to illustrate another particular embodiment of a search query extension method 300. In an illustrative embodiment, the method 300 may be performed by the system 100 of FIG. 1.

The method 300 of FIG. 3 is generally illustrated via a usage scenario of a query extension system (e.g., the system 100 of FIG. 1) by a user John after a user Bob asks John to find out where a person named "Kathy" is staying in a city called "Venice." The method 300 begins when a search query is entered. For example, the search query 302 that includes the search word "Venice" may be entered in the search field of an e-mail application that is displaying the currently opened e-mail 304. In an illustrative embodiment, the search query 302 may be entered into a search module, such as the search module 102 of FIG. 1.

The search query 302 may be used to retrieve a set of queries from a query repository. For example, the search query 302 that includes the search word "Venice" may be used to retrieve a set of queries 308 from a query repository 306 that includes a search engine log. Each query in the set of queries 308 may include the search word "Venice." In an illustrative embodiment, the set of queries 308 may be retrieved by a query repository module, such as the query repository module 110 of FIG. 1.

A set of context words may be formed based on the one or more computer-readable files. For example, the set of context words 314 may be formed based on the currently opened e-mail 304, where the set of context words 314 includes words from the currently opened e-mail 304. The set of context words 314 may be formed by a context module 312. In an illustrative embodiment, the context module 312 may include the context module 116 of FIG. 1.

It will be noted that multiple queries in the set of queries 308 are of the form "city, state." In a particular embodiment, the method 300 includes examining the set of queries 308 for such semantic patterns. For example, an examination of the set of queries 308 may result in the detection of the semantic pattern 310 <City, State>. When a semantic pattern is detected in a set of queries 308 from the query repository 306, the semantic pattern may be used by the context module 312 in generating a set of context words 314. For example, when the search query 302 includes a search word (e.g., "Venice") of a first word type (e.g., city) and the semantic pattern 310 includes an association of the first word type (e.g., city) with a second word type (e.g., state), the semantic pattern 310 may be used in generating the set of context words 314 such that the set of context words 314 includes words of the second word type (e.g., "New York," "Texas," and "Georgia") from the currently opened e-mail 304.

The set of queries 308 and the set of context words 314 may be sent to an intersection calculation module 316. The intersection calculation module 316 may calculate an intersection 318 of the set of queries 308 and the set of context words 314. In a particular embodiment, each item in the calculated intersection 318 includes at least one word that is common to both the set of context words 314 and the set of queries 308. For example, the intersection 318 includes an intersection item "Venice, N.Y." and an intersection item "Trains to Venice, N.Y." In an illustrative embodiment, the intersection calculation module 316 may include the intersection calculation module 122 of FIG. 1.

Upon being calculated, the intersection may be displayed to a user. For example, the intersection 318 may be displayed to the user John, and John may choose to extend his original search query 302 with one or more words from the intersection 318. For example, John may choose to append the word "NY" to his original search query 302 of "Venice." In another particular embodiment, the original search query 302 may be extended automatically without user intervention. In an illustrative embodiment, such an extended search query may be generated by a query extension module, such as the query extension module 124 of FIG. 1.

It will be appreciated that the method 300 of FIG. 3 may be used to extend and improve search queries. For example, in the particular embodiment illustrated in FIG. 3, if John entered the original search query "Venice" 302 into a search engine (e.g., the search engine 128 of FIG. 1), John may have received search results that included information about many different people, places, or things named "Venice," including information irrelevant to the "Venice" referred to in the currently opened e-mail 304. In contrast, when the original search query 302 is extended with one or more words from the intersection 318, the resulting extended search query may produce more relevant search results. For example, an extended search query of "trains Venice N.Y." may be used by John to find out what time Kathy's train may be arriving in Venice, N.Y., and an extended search query "Venice N.Y." may be used by John to try and find a list of all hotels in Venice, N.Y., so that he may call each hotel to find out whether Kathy is staying there. It will also be appreciated that the method 300 of FIG. 3 enables the use of semantic patterns to further improve and extend search queries. For example, a semantic pattern of <City, State> may be used to improve and extend a search query that includes only a city name or a state name. As another example, a semantic pattern of <First Name, Last Name> may be used to improve and extend a search query that includes only a first name or a last name.

Figure 4:
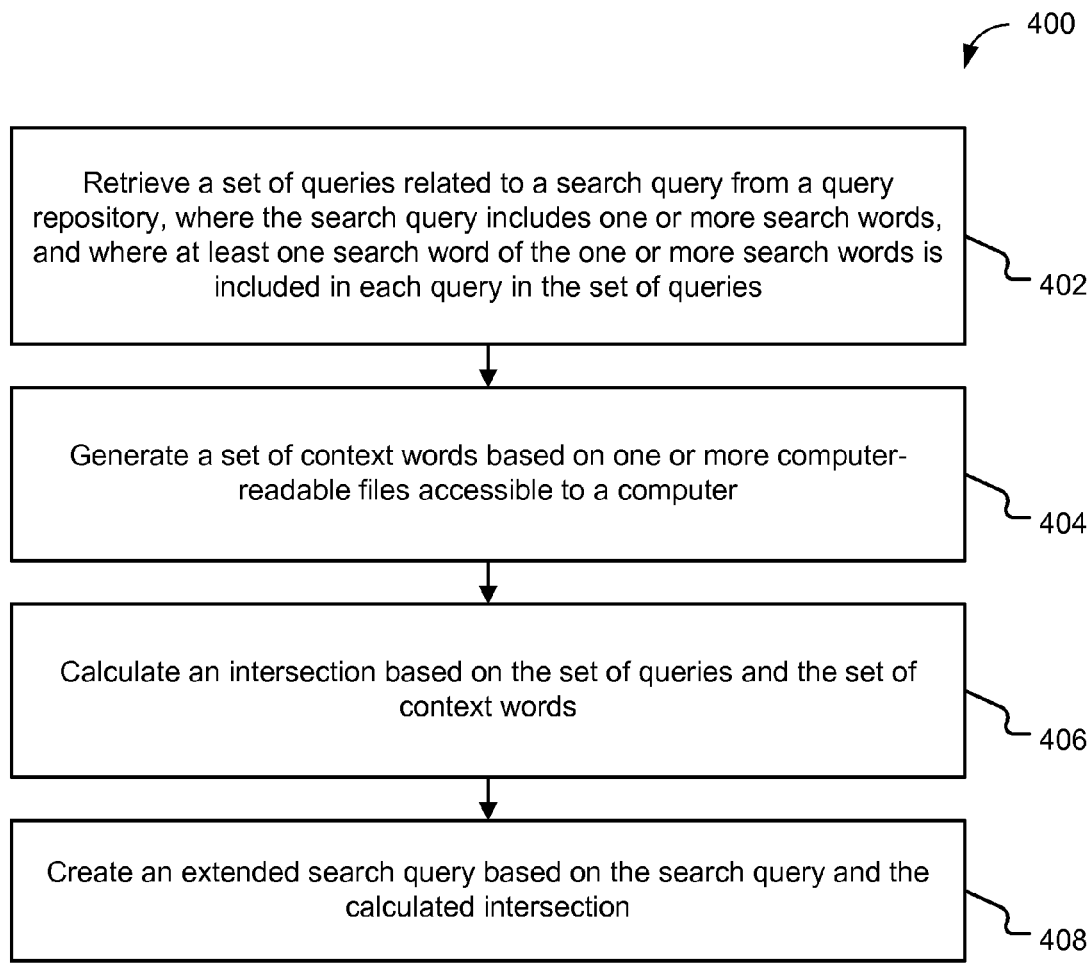
FIG. 4 is a flow diagram of another particular embodiment of a search query extension method.

FIG. 4 is a flow diagram of another particular embodiment of a search query extension method 400. In an illustrative embodiment, the method 400 may be performed by the system 100 of FIG. 1.

The method 400 includes retrieving a set of queries related to a search query from a query repository, at 402. The search query includes one or more search words, and at least one search word of the one or more search words is included in each query in the set of queries. For example, in FIG. 1, the query repository module 110 may retrieve the set of queries 112 from the query repository 114. In an illustrative embodiment, the set of queries may be retrieved as described with respect to the set of queries 208 of FIG. 2 or the set of queries 308 of FIG. 3.

The method 400 also includes generating a set of context words based on one or more computer-readable files accessible to a computer, at 404. For example, in FIG. 1, the context module 116 may generate the set of context words 118 based on the computer-readable files 120. In an illustrative embodiment, the set of context words may be generated as described with respect to the set of context words 212 of FIG. 2 or the set of context words 314 of FIG. 3.

The method 400 further includes calculating an intersection based on the set of queries and the set of context words, at 406. For example, in FIG. 1, the intersection calculation module 122 may calculate an intersection based on the set of queries 112 and the set of context words 118. In an illustrative embodiment, the intersection may be calculated as described with respect to the intersection 214 of FIG. 2 or the intersection 318 of FIG. 3.

The method 400 also includes creating an extended search query based on the search query and the calculated intersection, at 408. For example, in FIG. 1, the query extension module 124 may create the extended search query 126 based on the search query 104 and the intersection calculated by the intersection calculation module 122.

It will be appreciated that the method 400 of FIG. 4 may improve search results by extending search queries on the basis of common related queries (e.g., the set of queries from the query repository) and contextual information (e.g., the set of context words based on the computer-readable files). It will also be appreciated that the method 400 of FIG. 4 may be used in conjunction with a variety of different query repositories (e.g., search engine query logs, computer-readable files at a user computer, third-party databases, etc.) and a variety of different computer-readable files (e.g., documents, e-mails, instant messages, webpages, multimedia files, etc.).

Figure 5:
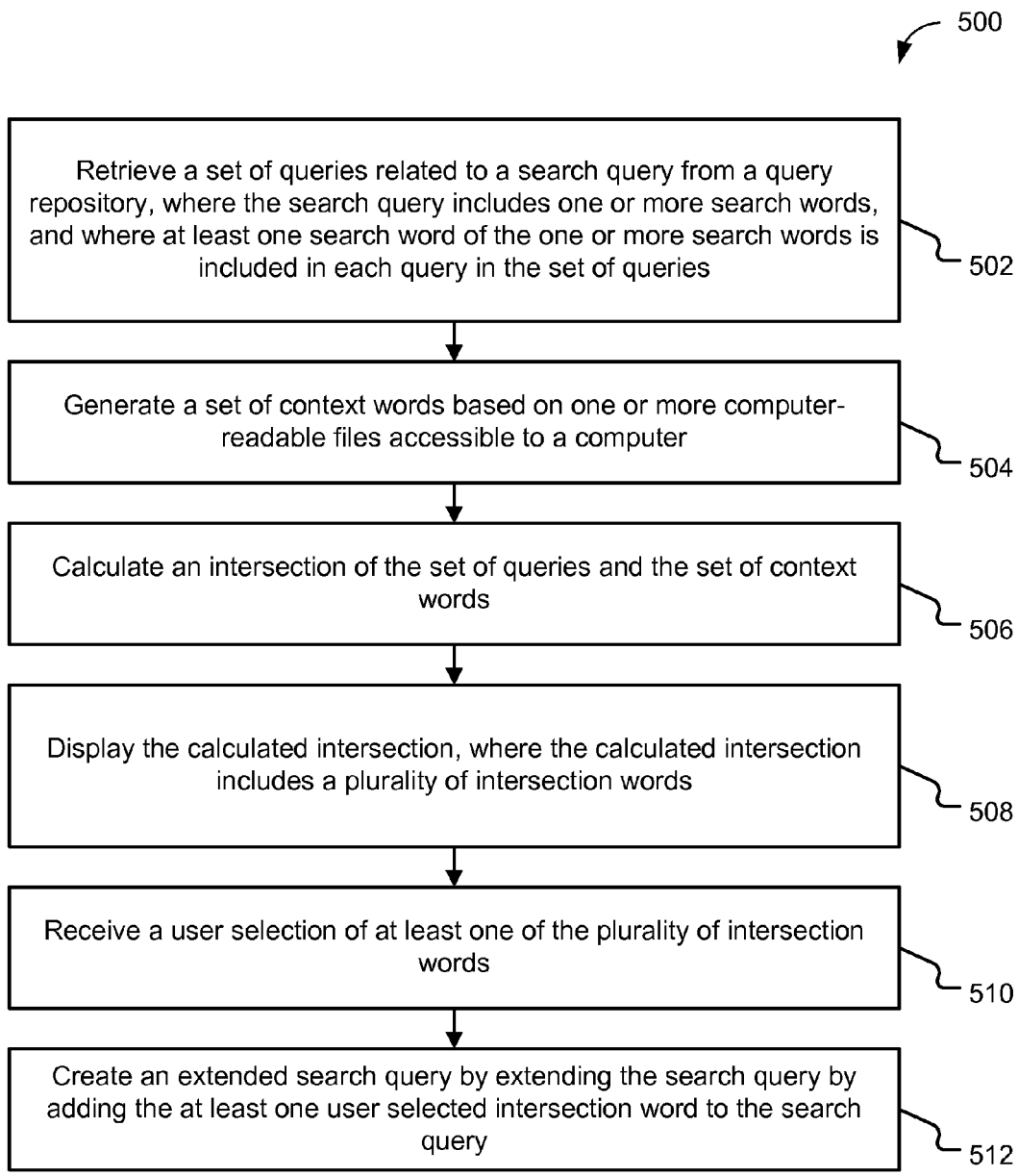
FIG. 5 is a flow diagram of another particular embodiment of a search query extension method.

FIG. 5 is a flow diagram of another particular embodiment of a search query extension method 500. In an illustrative embodiment, the method 500 may be performed by the system 100 of FIG. 1.

The method 500 includes retrieving a set of queries related to a search query from a query repository, at 502. The search query includes one or more search words, and at least one search word of the one or more search words is included in each query in the set of queries. For example, in FIG. 1, the query repository module 110 may retrieve the set of queries 112 from the query repository 114. In an illustrative embodiment, the set of queries may be retrieved as described with respect to the set of queries 208 of FIG. 2 or the set of queries 308 of FIG. 3.

The method 500 also includes generating a set of context words based on one or more computer-readable files accessible to a computer, at 504. For example, in FIG. 1, the context module 116 may generate the set of context words 118 based on the computer-readable files 120. In an illustrative embodiment, the set of context words may be generated as described with respect to the set of context words 212 of FIG. 2 or the set of context words 314 of FIG. 3.

The method 500 further includes calculating an intersection of the set of queries and the set of context words, at 506. For example, in FIG. 1, the intersection calculation module 122 may calculate an intersection of the set of queries 112 and the set of context words 118. In an illustrative embodiment, the intersection may be calculated as described with respect to the intersection 214 of FIG. 2 or the intersection 318 of FIG. 3.

The method 500 also includes displaying the calculated intersection, where the calculated intersection includes a plurality of intersection words, at 508. For example, in FIG. 1, the intersection calculated by the intersection calculation module 122 may be displayed.

The method 500 includes receiving a user selection of at least one of the plurality of intersection words, at 510. For example, a selection of at least one of the plurality of intersection words may be received by the user 106. As another example, a selection of at least one of the words in the intersection 214 of FIG. 2 may be received. As yet another example, a selection of at least one of the words in the intersection 318 of FIG. 3 may be received.

The method 500 also includes creating an extended search query by adding the at least one user selected intersection word to the search query, at 512. For example, in FIG. 1, the query extension module 124 may create the extended search query 126 by adding the at least intersection word selected by the user 106 to the search query 104. As another example, in FIG. 2, an extended search query may be created by adding the at least one selected word from the intersection 214 to the search query 206. As yet another example, in FIG. 3, an extended search query may be created by adding the at least one selected word from the intersection 318 to the search query 302.

It will be appreciated that the method 500 of FIG. 5 may enable a user to selectively extend a search query when the intersection between the set of queries from the query repository and the set of context words includes a large number of intersection words. It will also be appreciated that although the method 500 of FIG. 5 creates an extended search query by adding intersection words to a search query, the method 500 of FIG. 5 may also replace words in a the search query with intersection words.

Figure 6:
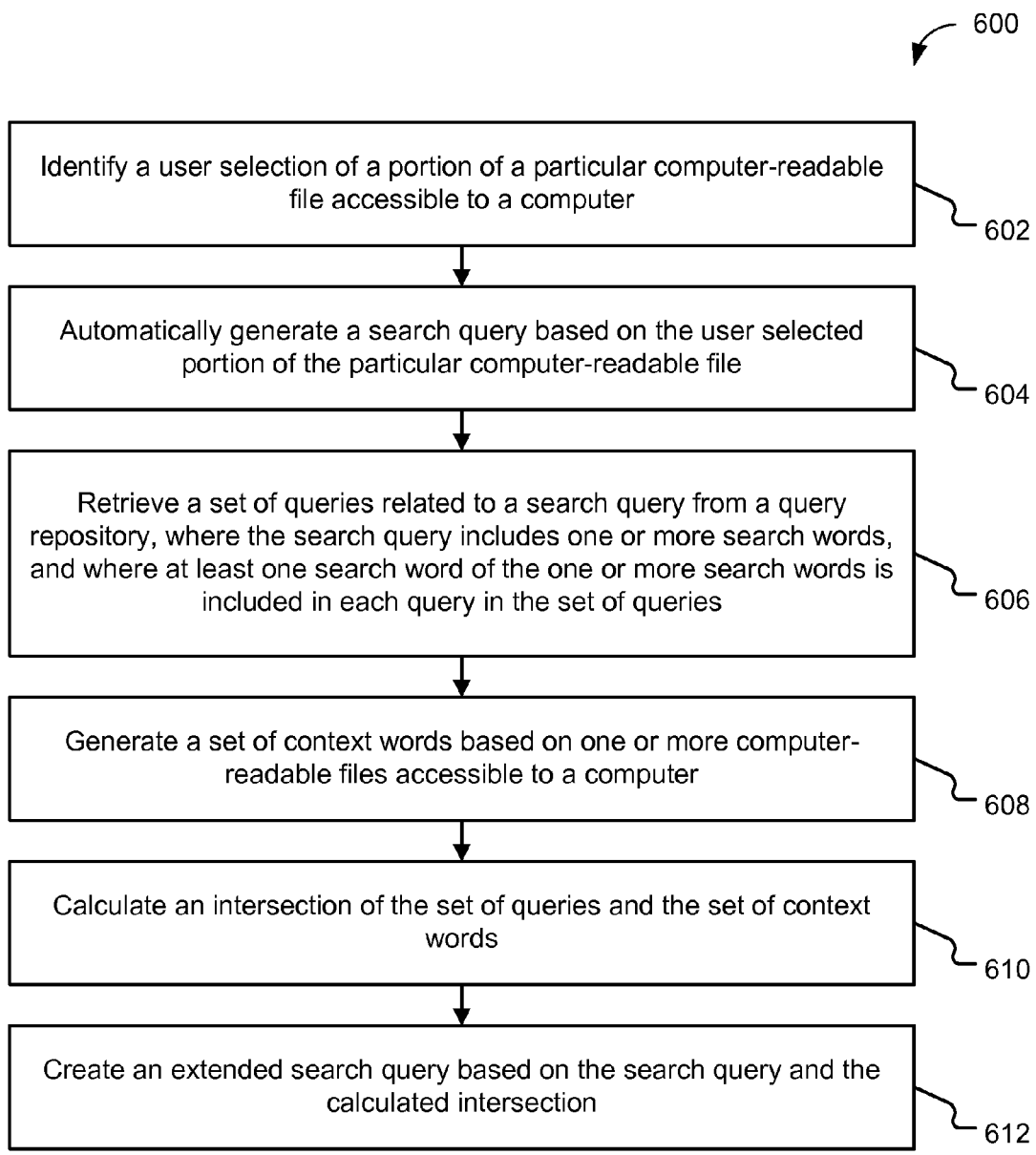
FIG. 6 is a flow diagram of another particular embodiment of a search query extension method.

FIG. 6 is a flow diagram of another particular embodiment of a search query extension method 600. In an illustrative embodiment, the method 600 may be performed by the system 100 of FIG. 1.

The method 600 includes identifying a user selection of a portion of a particular computer-readable file accessible to a computer, at 602. For example, in FIG. 1, the search module 102 may identify that the user 106 has selected a portion of one of the computer-readable files 120. In an illustrative embodiment, the user selection may be identified as described with respect to the user selection 202 of FIG. 2 of the word "Kathy" in the opened e-mail 204 of FIG. 2.

The method 600 also includes automatically generating a search query based on the user selected portion of the particular computer-readable file, at 604. For example, in FIG. 1, the search query 104 may be automatically generated by the search module 102 based on the portion of one of the computer-readable files 120 selected by the user 106. In an illustrative embodiment, the search query may be generated as described with reference to the search query 206 of FIG. 2.

The method 600 further includes retrieving a set of queries related to a search query from a query repository, at 606. The search query includes one or more search words, and at least one search word of the one or more search words is included in each query in the set of queries. For example, in FIG. 1, the query repository module 110 may retrieve the set of queries 112 from the query repository 114. In an illustrative embodiment, the set of queries may be retrieved as described with respect to the set of queries 208 of FIG. 2 or the set of queries 308 of FIG. 3.

The method 600 also includes generating a set of context words based on one or more computer-readable files accessible to a computer, at 608. For example, in FIG. 1, the context module 116 may generate the set of context words 118 based on the computer-readable files 120. In an illustrative embodiment, the set of context words may be generated as described with respect to the set of context words 212 of FIG. 2 or the set of context words 314 of FIG. 3.

The method 600 includes calculating an intersection of the set of queries and the set of context words, at 610. For example, referring to FIG. 1, the intersection calculation module 122 may calculate an intersection of the set of queries 112 and the set of context words 118. In an illustrative embodiment, the intersection may be calculated as described with respect to the intersection 214 of FIG. 2 or the intersection 318 of FIG. 3.

The method 600 also includes creating an extended search query based on the search query and the calculated intersection, at 612. For example, referring to FIG. 1, the query extension module 124 may create the extended search query 126 based on the search query 104 and the intersection calculated by the intersection calculation module 122.

It will be appreciated that the method 600 of FIG. 6 may be used to automatically generate search queries based on user selections of computer-readable files. It will thus be appreciated that the method 600 of FIG. 6 may be used to activate a search query extension without requiring the use of a search field or a search function of an application.

Figure 7:
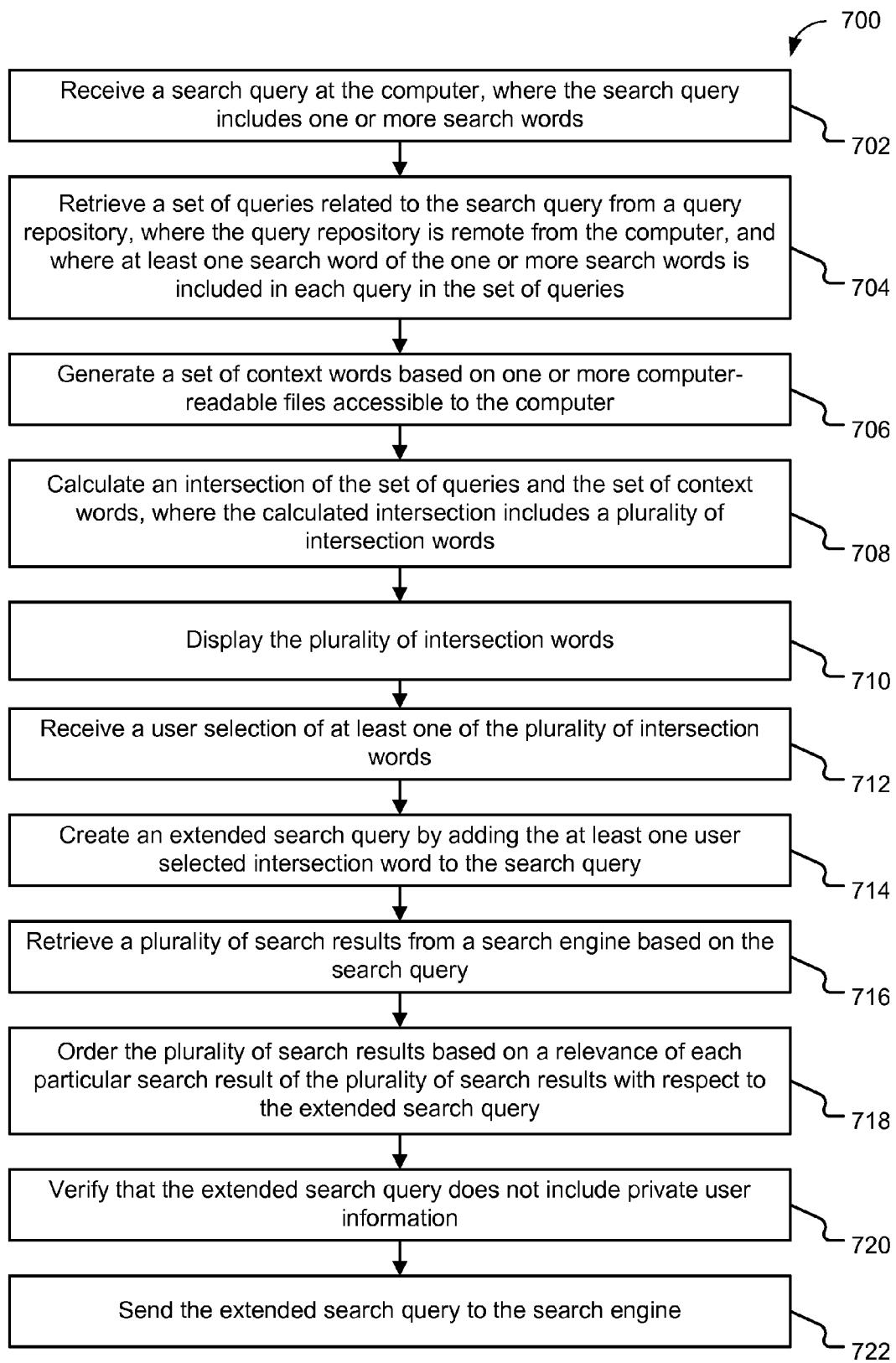
FIG. 7 is a flow diagram of another particular embodiment of a search query extension method.

FIG. 7 is a flow diagram of another particular embodiment of a search query extension method 700. In an illustrative embodiment, the method 700 may be performed by the system 100 of FIG. 1.

The method 700 includes receiving a search query at a computer, where the search query includes one or more search words, at 702. For example, referring to FIG. 1, the search query 104 may be received at the computer 108. In an illustrative embodiment, the search query may be received as described with respect to the search query 206 of FIG. 2 or the search query 302 of FIG. 3.

The method 700 also includes retrieving a set of queries related to the search query from a query repository that is remote from the computer, at 704. At least one search word of the one or more search words is included in each query in the set of queries. For example, referring to FIG. 1, the query repository module 114 may retrieve the set of queries 112 from the query repository 114 that is remote from the computer 108. In an illustrative embodiment, the set of queries may be retrieved as described with respect to the set of queries 208 of FIG. 2 or the set of queries 308 of FIG. 3.

The method 700 further includes generating a set of context words based on one or more computer-readable files accessible to the computer, at 706. For example, referring to FIG. 1, the context module 116 may generate the set of context words 118 based on the computer-readable files 120. In an illustrative embodiment, the set of context words may be generated as described with respect to the set of context words 212 of FIG. 2 or the set of context words 314 of FIG. 3.

The method 700 also includes calculating an intersection of the set of queries and the set of context words, where the intersection includes a plurality of intersection words, at 708.

For example, referring to FIG. 1, the intersection calculation module 122 may calculate an intersection of the set of queries 112 and the set of context words 118. In an illustrative embodiment, the intersection may be calculated as described with respect to the intersection 214 of FIG. 2 or the intersection 318 of FIG. 3.

The method 700 includes displaying the plurality of intersection words, at 710. For example, in reference to FIG. 1, the intersection calculated by the intersection calculation module 122 may be displayed.

The method 700 also includes receiving a user selection of at least one of the plurality of intersection words, at 712. For example, a selection of at least one of the plurality of intersection words may be received from the user 106. As another example, a selection of at least one of the words in the intersection 214 of FIG. 2 may be received. As yet another example, a selection of at least one of the words in the intersection 318 of FIG. 3 may be received.

The method 700 further includes creating an extended search query by adding the at least one user selected intersection word to the search query, at 714. For example, referring to FIG. 1, the query extension module 124 may create the extended search query 126 by adding the at least one intersection word selected by the user 106 to the search query 104. As another example, referring to FIG. 2, an extended search query may be created by adding the at least one selected word from the intersection 214 to the search query 206. As yet another example, referring to FIG. 3, an extended search query may be created by adding the at least one selected word from the intersection 318 to the search query 302.

The method 700 also includes retrieving a plurality of search results from a search engine based on the search query, at 716. For example, referring to FIG. 1, the search module 102 may retrieve the search results 132 based on the search results 104 from the search engine 128.

The method 700 includes ordering the plurality of search results based on a relevance of each particular search result of the plurality of search results with respect to the extended search query, at 718. For example, in reference to FIG. 1, the search results 132 may be ordered based on the relevance of each particular search result with respect to the extended search query 126.

The method 700 also includes verifying that the extended search query does not include private user information, at 720. For example, in FIG. 1, the system 100 may verify that the extended search query 126 does not include any private information about the user 106.

The method 700 further includes sending the extended search query to the search engine, at 722. For example, the search module 102 may send the extended search query 126 to the search engine 128, as illustrated in FIG. 1.

It will be appreciated that the method 700 of FIG. 7 may improve the quality of search results by ordering search results for a search query based on the relevance of each search result to an extended search query. It will also be appreciated that the method 700 of FIG. 7 may protect private user information. For example, the method 700 of FIG. 7 may verify that no private user information (e.g., private information from a computer-accessible file such as an address book) is present in an extended search query before sending the extended search query to a search engine. In a particular embodiment, such private user information is removed from the extended search query before the extended search query is sent to a search engine. In another particular embodiment, a user may be notified of the presence of such private user information in the extended search query and may be given an option to either remove or edit the private user information or submit the extended search query as is.

Figure 8:
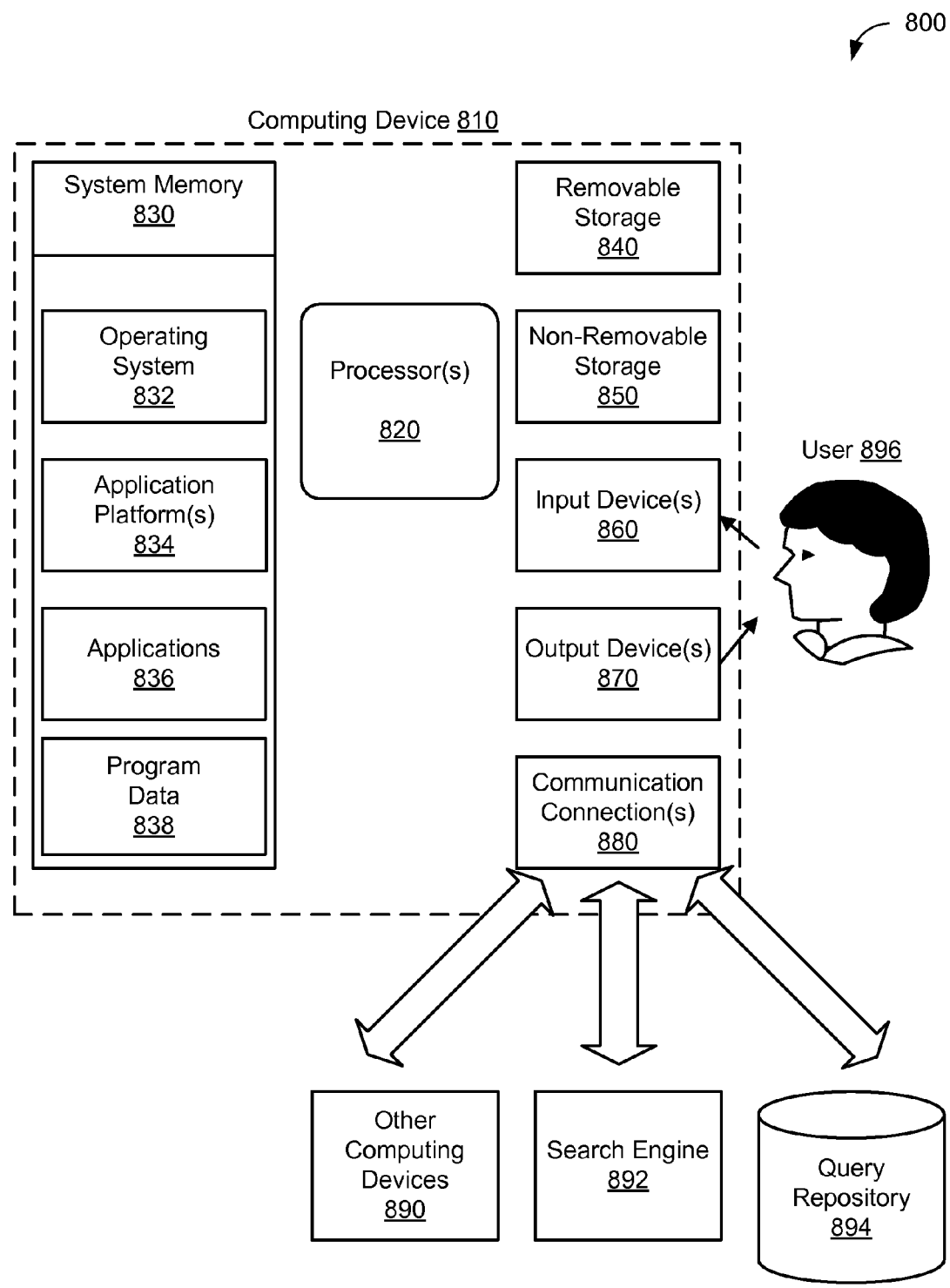
FIG. 8 is a block diagram of an illustrative embodiment of a general purpose computing system.

FIG. 8 shows a block diagram of a computing environment 800 including a computing device 810 operable to support embodiments of computer-implemented methods and computer program products according to the present disclosure. In a basic configuration, the computing device 810 may include the computer 108 of FIG. 1.

The computing device 810 typically includes at least one processor 820 and system memory 830. Depending on the configuration and type of computing device, the system memory 830 may be volatile (such as random access memory or "RAM"), non-volatile (such as read-only memory or "ROM," flash memory, and similar memory devices that maintain stored data even when power is not provided) or some combination of the two. The system memory 830 typically includes an operating system 832, one or more application platforms 834, one or more applications 836, and may include program data 838. In an illustrative embodiment, the system memory 830 may include one or more modules as disclosed herein, such as the modules 102, 110, 116, 122, and 124 of FIG. 1, the module 216 of FIG. 2, or the module 316 of FIG. 3.

The computing device 810 may also have additional features or functionality. For example, the computing device 810 may also include removable and/or non-removable additional data storage devices such as magnetic disks, optical disks, tape, and standard-sized or miniature flash memory cards. Such additional storage is illustrated in FIG. 8 by removable storage 840 and non-removable storage 850. Computer storage media may include volatile and/or non-volatile storage and removable and/or non-removable media implemented in any method or technology for storage of information such as computer-readable instructions, data structures, program components or other data. The system memory 830, the removable storage 840 and the non-removable storage 850 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium which can be used to store information and which can be accessed by computing device 810. Any such computer storage media may be part of the computing device 810. The computing device 810 may also have input device(s) 860, such as a keyboard, mouse, pen, voice input device, touch input device, etc. Output device(s) 870, such as a display, speakers, printer, etc. may also be included. The computing device 810 may receive input from a user 896 via the input devices(s) 860, and may provide output to the user 896 via the output device(s) 870. In an illustrative embodiment, the user 896 is the user 106 of FIG. 1

The computing device 810 also contains one or more communication connections 880 that allow the computing device 810 to communicate with other computing devices 890 over a wired or a wireless network. The computing device 810 may also communicate with a search engine 892 and a query repository 894 via the one or more communication connections 880. In an illustrative embodiment, the search engine 892 includes the search engine 128 of FIG. 1. In another illustrative embodiment, the query repository 894 includes the query repository 114 of FIG. 1, the query repository 210 of FIG. 2, or the query repository 306 of FIG. 3. The one or more communication connections 880 are an example of communication media. By way of example, and not limitation, communication media may include wired media such as a wired network or direct-wired connection, and wireless media, such as acoustic, radio frequency (RF), infrared and other wireless media. It will be appreciated, however, that not all of the components or devices illustrated in FIG. 8 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. To clearly illustrate this interchangeability of hardware and software, various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable any person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   at a computer device:
   retrieving a set of queries related to a search query from a query repository, wherein the search query includes one or more search words provided to the computer device by a user, and wherein at least one search word of the one or more search words is included in each query in the set of queries;
   generating a set of context word based on one or more computer-readable files retrieved from the computer device;
   calculating an intersection of the set of queries and the set of context words; and
   creating an extended search query of the search query and the calculated intersection;
   displaying the calculated intersection, wherein the calculated intersection includes a plurality of intersection words; and
   receiving a user selection of at least one of the plurality of intersection words, wherein the extended search query is created by adding the at least one user selected intersection word to the search query.

2. The method of claim 1, wherein the calculated intersection includes one or more intersection words and wherein creating the extended search query includes adding at least one intersection word to the search query.

3. The method of claim 1, further comprising retrieving search results from a search engine based on the extended search query.

4. The method of claim 1, further comprising removing private user information from the extended search query before sending the extended search query to a search engine.

5. The method of claim 1, wherein the query repository includes a query log associated with a search engine, wherein the search engine is remote from the computer device, and wherein the computer-readable files include user information and are stored locally within the computer device.

6. The method of claim 5, wherein the set of queries from the query repository is ordered based on how many times each query in the set of queries has been submitted to the search engine.

7. The method of claim 1, wherein the one or more computer-readable files accessible to the computer device includes a document, an electronic mail (e-mail) message, a webpage, an instant message, or any combination thereof.

8. The method of claim 7, wherein the document, the e-mail message, the webpage, or the instant message is open at the computer device when the set of context words is generated.

9. The method of claim 1, further comprising:
   retrieving a plurality of search results from a search engine based on the search query; and
   ordering the plurality of search results based on a relevance of each particular search result of the plurality of search results to the extended search query.

10. The method of claim 1, further comprising:
identifying a user selected portion of a particular computer-readable file that is accessible to the computer device; and
automatically generating the search query based on the user selected portion of the particular computer-readable file.

11. A system comprising:
a processor; and
a memory coupled to the processor, the memory including:
a search module comprising computer-executable instructions that are executable by the processor to receive a search query, wherein the search query includes one or more search words;
a query repository module comprising computer-executable instructions that are executable by the processor to retrieve a set of queries related to the search query from a query repository, wherein at least one search word of the one or more search words is included in each query in the set of queries;
a context module comprising computer-executable instructions, executable by the processor to generate a set of context words based on one or more computer-readable files accessible to the processor and stored within the memory;
an intersection calculation module comprising computer-executable instructions executable by the processor to calculate art intersection of the set of queries and the set of context words; and
a query extension module comprising computer-executable instructions executable by the processor to create an extended search query based on the search query and the calculated intersection;
wherein the set of context words is generated based on at least one semantic pattern in the set of queries, wherein the search query includes a search word of a first word type, wherein the at least one semantic pattern in the set of queries includes an association of the first word type with a second word type, and wherein the set of context words includes at least one word of the second word type, the at least one word of the second word type retrieved from the one or more computer-readable files accessible to the processor.

12. The system of claim 11, wherein the query repository includes one or more files associated with a user of a computer that includes the processor.

13. The system of claim 11, wherein the calculated intersection includes one or more intersection words included in the set of queries and the set of context words.

14. The system of claim 11, wherein the search module, the query repository module, the context module, the intersection calculation module, the query extension module, or any combination thereof is included in an application at a computer.

15. The system of claim 14, wherein the application includes an e-mail application, an instant message application, a word processing application, a spreadsheet application, a presentation application, or a multimedia application.

16. A computer-readable memory comprising instructions, that when executed by a computer, cause the computer to:
receive a search query at the computer, wherein the search query includes one or more search words;
retrieve a set of queries related to the search query from a query repository, wherein the query repository is remote from the computer, mad wherein at least one search word of the one or more search words is included in each query in the set of queries;
generate a set of context words based on one or more computer-readable files retrieved from the computer, wherein the set of context words is generated based on at least one semantic pattern in the set of queries, wherein the search query includes a search word of a first word type, wherein the at least one semantic pattern in the set of queries includes an association of the first word type with a second word type, and wherein the set of context words includes at least one word of the second word type, the at least one word of the second word type retrieved from the one or more computer-readable files retrieved from the computer;
calculate an intersection of the set of queries and the set of context words, wherein the calculated intersection includes a plurality of intersection words;
display the plurality of intersection words;
receive a user selection of at least one of the plurality of intersection words;
create an extended search query by adding the at least one user selected intersection word to the search query;
retrieve a plurality of search results from a search engine based on the search query; arid order the plurality of search results based on a relevance of each particular search result of the plurality of search results with respect to the extended search query.

17. The computer-readable memory of claim 16, further comprising instructions, that when executed by the computer, cause the computer to remove private user information from the extended search query before sending the extended search query to the search engine.

* * * * *